(12) United States Patent
Brine

(10) Patent No.: US 11,434,649 B2
(45) Date of Patent: Sep. 6, 2022

(54) SUPPORT DEVICE

(71) Applicant: Rapid EPS Ltd, Leeds (GB)

(72) Inventor: David Michael Brine, Leeds (GB)

(73) Assignee: RAPID EPS LTD, Leeds (GB)

( * ) Notice: Subject to any disclaimer, the term of this patent is extended or adjusted under 35 U.S.C. 154(b) by 117 days.

(21) Appl. No.: 16/669,709

(22) Filed: Oct. 31, 2019

(65) Prior Publication Data

US 2020/0141138 A1     May 7, 2020

(30) Foreign Application Priority Data

Nov. 1, 2018 (GB) .................................... 1817870

(51) Int. Cl.
*E04G 21/32* (2006.01)
*F16M 11/28* (2006.01)
(52) U.S. Cl.
CPC ......... *E04G 21/3233* (2013.01); *F16M 11/28* (2013.01)
(58) Field of Classification Search
CPC ...... E04G 21/3233; E04G 25/04; F16M 11/28
USPC .................................................... 248/218.4
See application file for complete search history.

(56) References Cited

U.S. PATENT DOCUMENTS

| 3,333,808 | A | * | 8/1967 | Du Boff | ................. | E04G 25/04 |
| | | | | | | 248/200.1 |
| 3,822,850 | A | * | 7/1974 | Elias | .................. | E04G 21/3233 |
| | | | | | | 248/200.1 |
| 3,917,208 | A | * | 11/1975 | Magers | .................. | E04B 2/822 |
| | | | | | | 248/200.1 |
| 5,924,469 | A | * | 7/1999 | Whittemore | ............ | E04G 21/30 |
| | | | | | | 248/200.1 |
| 7,255,312 | B2 | * | 8/2007 | Melic | ................. | E04G 21/3233 |
| | | | | | | 248/200.1 |
| 8,002,229 | B2 | | 8/2011 | Hewson | | |
| 2010/0012427 | A1 | * | 1/2010 | Julliard | ............. | A62B 35/0068 |
| | | | | | | 182/82 |
| 2010/0301000 | A1 | * | 12/2010 | Whittemore | ............ | E04G 21/24 |
| | | | | | | 211/123 |
| 2018/0106054 | A1 | * | 4/2018 | Coote | ..................... | E04G 17/14 |
| 2021/0087839 | A1 | * | 3/2021 | Callanan | ............... | F16B 21/125 |

* cited by examiner

*Primary Examiner* — Muhammad Ijaz
(74) *Attorney, Agent, or Firm* — GableGotwals

(57) ABSTRACT

A support device with at least first and second support members movable with respect to each other in a direction parallel to their longitudinal axes. The support device having distal ends and the distal ends each including an anchor portion to engage directly or indirectly with a suitable surface in use, the support device including a biasing assembly for biasing one or more of the distal ends of the support device into engagement with a suitable surface in use, and the biasing assembly is located at or adjacent an end of at least one of said first and second support members and between said support member end and the anchor portion nearest to said support member end. The support device is particularly suited to a safety fence or assembly or a worker protection system.

28 Claims, 1 Drawing Sheet

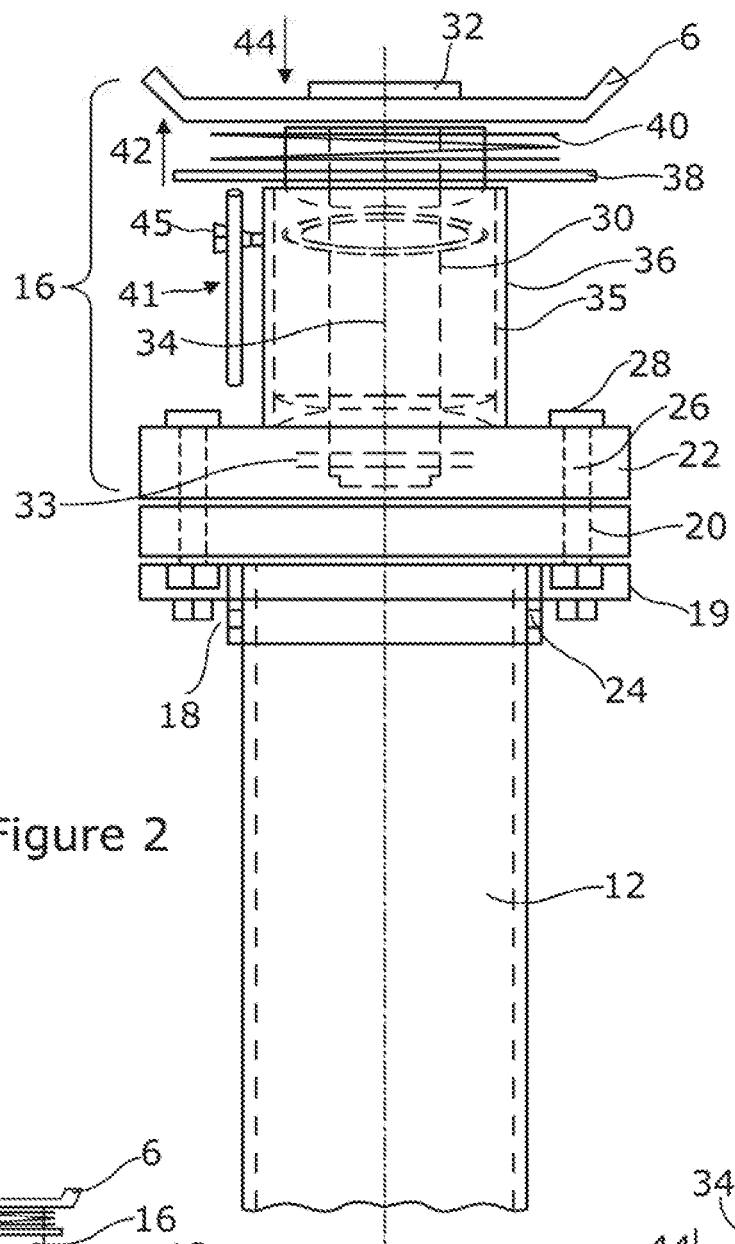
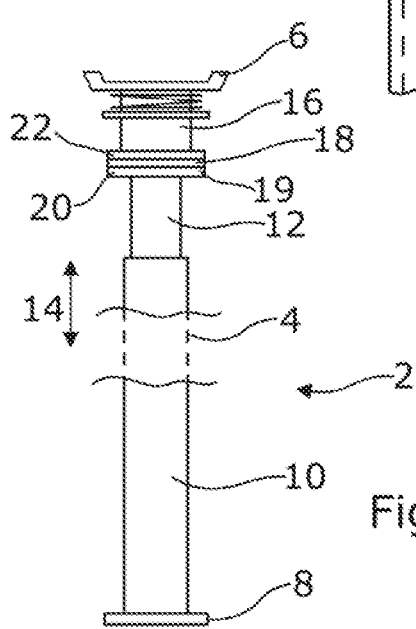
Figure 1
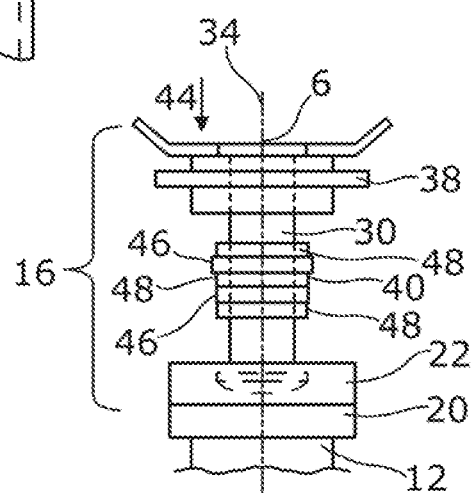
Figure 2
Figure 3

SUPPORT DEVICE

CROSS-REFERENCE TO RELATED APPLICATIONS

This United States application claims priority to British Patent Application No. 1817870.7 filed 1 Nov. 2018 which is incorporated herein by reference.

BACKGROUND OF THE INVENTION

The invention relates to a support device and a method of use thereof and, while the use of the support device is particularly suited to a safety fence or assembly or a worker protection system in an industry such as the construction industry, it should be appreciated that other uses of the support device are possible to advantageous effect.

At present, it is known to use safety posts, fences and barriers during the construction of buildings to prevent construction workers from falling inadvertently from gaps, open sides or other hazards of the building and injuring themselves. The safety posts are typically located between a floor and a ceiling or roof of the new construction and a safety fence or barrier is then fitted between the adjacent spaced apart posts to form, in combination, a temporary safety wall or barrier.

Conventionally, the safety posts are fitted by drilling a hole in the floor of the building and/or roof and bolting a foot support in the hole and attaching a first end of the post to a foot support and a second end of the post to the roof or ceiling. Problems with this type of approach include that holes need to be drilled in the floor and the foot support is then required to be manually bolted to the floor, thereby causing the construction of the posts and fences assemblies to be time consuming to fit, can require special tools, can have an impact on the structure both in terms of strength and/or aesthetic appeal and also can use up expensive worker time. However, because of the safety issues and the benefits which are obtained, it has until relatively recently, been regarded as a required process.

In the Applicant's U.S. Pat. No. 8,002,229, there is disclosed an improvement to this process in which there is provided a support device which includes a support device post including first and second telescopic members and the opposing ends of the support device engage with suitable surfaces. Locking means can be provided on the first and/or second members to lock the members in a required relative position and to allow extension of the support device to the required length within a range of lengths.

The locking means can include a locking portion moveably mounted on the first and/or second members and actuating means which allow the locking portion to move between a first unlocked position and a second, locked position. Resilient biasing means can also be provided within the inner of the two members which act to bias one of the foot supports outwardly and thereby provide an engagement force which acts to help retain the support post device between the two contact surfaces in use.

Although this system provides significant advantages, problems with this type of device can still be experienced, such as for example, there may be problems with regard to the maintenance of the device as the biasing means are located within one of the members and most typically, the inner member and therefore can be difficult to maintain and/or access for removal and replacement Furthermore, due to the difficulty in accessing the biasing means of the conventional device, there is a problem with the ingress of dirt and debris which can adversely affect the operation of the biasing means and hence the support device over time.

SUMMARY OF THE INVENTION

An aim of the present invention is therefore to provide a support device which includes a biasing means assembly which provides the required locating force whilst allowing for improved access to the same.

It is a further aim of the present invention to provide a method of using a support device including a biasing means assembly.

According to a first aspect of the present invention there is provided a support device, said support device including at least first and second support members, each support member having a longitudinal axis, said at least first and second support members movable with respect to each other in a direction parallel to their longitudinal axes, the support device having distal ends and the distal ends each including an anchor portion to engage directly or indirectly with a suitable surface in use, the support device including a biasing assembly for biasing one or more of the distal ends of the support device into engagement with a suitable surface in use, and wherein the biasing assembly is located at or adjacent an end of at least one of said first and second support members and between said support member end and the anchor portion nearest to said support member end.

Thus, rather than the biasing assembly being provided internally of a support member as in the prior art, the biasing assembly of the present invention is provided separate to and external of the support members. This allows maintenance and accessibility of the biasing assembly to be improved.

Preferably each of the at least first and second support members has a first end and a second end. Further preferably the first end of the support member is adjacent to the anchor portion and is at or adjacent one of the distal ends of the support device. Preferably the second end of the support member locates in or around another or the other support member.

Preferably the biasing assembly includes biasing means or at least one biasing member.

In one embodiment, the biasing assembly is located on, at or adjacent an end of the support member which acts as an inner member of the support device (i.e., the support member, at least part of which is arranged to move inside of the outer support member to allow relative movement between the support members in use). For example, the biasing assembly can be located on, at or adjacent an end of the first support member, and further preferably a first end of the first support member.

Preferably at least one of the first and second support members is hollow or partially hollow, and at least part of the other of the first and second support members is movably mounted within the hollow or partially hollow support member.

Preferably the at least first and second support members are slidably movable relative to each other in use.

Preferably the at least first and second support members are telescopically mounted with respect to each other.

Preferably the at least first and second support members are movable relative to each other between an extended or relatively extended position, and a retracted or relatively retracted position.

Preferably with the at least first and second support members in an extended or relatively extended position, the support device is longer in length than when the at least first and second support members is in a retracted or relatively retracted position.

Preferably the length of the support device is adjusted to allow engagement between two surfaces in use, and further preferably two opposing surfaces in use.

Preferably a user selectively moves the at least first and second support members to a position or length that allows engagement between two suitable surfaces in use.

Preferably each of the at least first and second support members are elongate or substantially elongate in form.

Preferably each of the at least first and second support members are linear or substantially linear in form.

Thus, preferably in one example, the support device is in the form of an elongate support post.

Preferably each of the at least first and second support members are rigid or substantially rigid in form.

Preferably the first and second support members are made from any or any combination of metal(s), stainless steel and/or the like.

Preferably the anchor portion allows anchoring and/or engagement of said portion with a suitable surface in use. In one example, the anchor portion includes one or more teeth for engaging with a surface in use.

Preferably the anchor portion is in the form of a plate, and further preferably the plate includes one or more teeth or engaging portions for engaging with a surface in use.

In one example, the anchor portion is in the form of a foot portion.

Preferably the support device includes locking means or a locking mechanism for locking the at least first and second members in a required or selected position, or at a required or selected length, in use. Further preferably the required or selected position or length is user selected.

Preferably the locking means or locking mechanism are movable from a locked position, wherein relative movement of the at least first and second members is prevented or substantially prevented, and an unlocked position, wherein relative movement of the at least first and second members is possible or allowed.

Preferably the locking means or mechanism includes user actuation means or a user actuation handle for allowing movement of the locking means or mechanism between the locked and unlocked positions in use.

Preferably the locking means or mechanism includes at least one locking portion movably mounted on the first and/or second support members for movement between the locked and unlocked positions in use.

Preferably the user actuation means or handle is able to move the at least one locking portion between the locked and unlocked positions in use.

In one embodiment engagement means or an engagement mechanism is provided for engaging the biasing assembly to one or both of the support member ends in use.

In one embodiment, the support member end to which said biasing assembly is fitted, located or associated with is provided with a flange. Preferably the biasing assembly is attached to, located on or associated with the flange via the engagement means or engagement mechanism. Thus, in one example, an end or first end of the support member is provided with a flange to which the biasing assembly can be directly or indirectly engaged with.

Preferably the flange is in the form of an outwardly protruding or radially outwardly protruding skirt or member protruding outwardly of the support member.

In one embodiment at least part of the biasing assembly engages directly with the flange of the support member.

In one embodiment, the biasing assembly engages indirectly with the support member.

Preferably one or more spacer members can be provided between the flange of the support member and the biasing assembly and the biasing assembly engages with the one or more spacer members and/or the flange of the support member.

In one embodiment, the biasing assembly is also provided with a flange, radially outwardly protruding or outwardly protruding member which acts as an interface with the flange or outwardly protruding member of the said support member. Preferably the engagement means or engagement mechanism is provided to join the respective flanges or outwardly protruding members together and hence join the biasing assembly to the support member in use.

Preferably the engagement means or engagement mechanism includes one or more screws, nuts and bolts, interengaging members, clips, pins, shaft members, friction fit, welding and/or the like.

Preferably the biasing assembly has a first end which is provided on, joined to or associated with the support member (such as for example via the flange), and a second end which is provided on, joined to or associated with the anchor portion.

In one embodiment, the biasing assembly includes an inner shaft which is used to provide support and rigidity to the biasing assembly and/or to secure the biasing assembly to the support member or to a spacer member at the first end and/or to the anchor portion at the second end.

Preferably the inner shaft has a longitudinal axis and further preferably this longitudinal axis is parallel or substantially parallel to the longitudinal axis of the support device/support members.

In one embodiment the inner shaft of the biasing assembly engages with the flange or outwardly of the biasing assembly and/or support member.

Preferably the biasing assembly includes a housing and the biasing means and/or at least one biasing member is contained within the housing in use. Preferably the housing provides some protection for and/or prevents ingress of dirt into the biasing means and/or at least one biasing member in use, while allowing easy access to the biasing means and/or biasing member as and when required.

Preferably the housing of the biasing assembly is detachably attached or removably located with the biasing assembly in use.

In one example the housing of the biasing assembly is cylindrical in shape and/or is of the same or similar shape to the support member with which it is associated with in use.

Preferably the housing of the biasing assembly is located between the flange or outwardly protruding member of the biasing assembly and/or support member and the anchor portion.

Preferably said housing of the biasing assembly is located with respect to the biasing assembly but is not engaged with the biasing assembly or the anchor portion.

In one embodiment the biasing assembly includes first biasing means or at least a first biasing member. Preferably the first biasing means or at least first biasing member sits within the housing of the biasing assembly in use.

Preferably the first biasing means or at least first biasing member is for biasing an end of the support device into engagement with a surface in use.

In one embodiment the biasing assembly and/or the support device includes second biasing means or at least a second biasing member. Preferably the second biasing means or at least second biasing member sits external to or at least partially externally of the housing of the biasing assembly.

Preferably the second biasing means or at least second biasing member is separate and distinct to the first biasing means.

Preferably the second biasing means or at least second biasing member is for providing a biasing force for a compression indication means or mechanism in use.

In one example the first biasing means or at least first biasing member is separated from the second biasing means or at least second biasing member by a washer, spacer member and/or the like.

In one embodiment, the second biasing means or at least second biasing member is located between the said biasing assembly housing and the anchor portion.

In one embodiment compression indication means or mechanism is provided on or associated with the support device, the biasing assembly and/or the housing of the biasing assembly for providing an indication to a user as to whether the support device has been placed under sufficient compression in use (i.e. is securely engaged between the two surfaces in use).

Preferably the compression indication means or mechanism can include any or any combination of visual, audio or kinaesthetic means or mechanisms.

In one example, the compression indication means includes a pivotable member which moves between at least first and second positions in use; the first position showing adequate compression is being applied to the support device, and the second position showing inadequate compression or no compression is being applied to the support device.

Preferably the pivotable member is in a horizontal position, substantially horizontal position, or is perpendicular or substantially perpendicular with respect to the longitudinal axes of the support members when in the first position.

Preferably the pivotable member is at an acute angle to the horizontal or with respect to the longitudinal axes of the support members when in the second position.

Thus, there is provided in accordance with the invention, a support device which includes a biasing means assembly which is located externally of the first and/or second members of the support device thereby allowing maintenance of the assembly to be improved and accessibility of the same to also be improved.

Preferably the biasing means or at least one biasing member are resilient biasing means.

Preferably the biasing means are arranged so as to provide a biasing force in the direction parallel or substantially parallel to the longitudinal axis of the biasing assembly, the support device and/or the support members.

Preferably the biasing means or at least one biasing member are provided on or associated with the inner shaft of the biasing assembly. For example, the biasing means or at least one biasing member could be provided around an external surface of said inner shaft.

In one embodiment, the biasing means, or at least one biasing member includes one or more springs, Belleville washers, an arbor, non-metallic compression bushes or members and/or the like. For example, an arbor which comprises one or a plurality of non-metallic compression bushes can be provided which, in one embodiment, may be formed of urethane, or solid rubber.

In one embodiment the first biasing means or first biasing member is the same as the second biasing means or second biasing member. Alternatively, the first biasing means or first biasing member is different in form or type to the second biasing means or second biasing member. For example, the first biasing means could be Belleville washer or an arbor and the second biasing means could be a compression spring.

In one embodiment the biasing means or at least one biasing member allows the resilient movement of the anchor portion towards and away from the biasing assembly (for example towards or away from the flange of the biasing assembly) and in a resilient manner so as to bias the anchor portion away from the biasing assembly (for example away from the flange of the biasing assembly). This therefore means that, in turn, when the biasing assembly is attached to the support member of the support device, the anchor portion is biased away from the support member.

In one embodiment the at least first and second support members are telescopically movable or mounted. For example, at least part of the first support member is telescopically mounted in a hollow portion of the at least second support member.

In a further aspect of the invention, there is provided a biasing assembly for use with a support device.

Preferably the biasing assembly is a resilient biasing assembly for use with a telescopic support device, said biasing assembly provided with a support plate or foot portion at one end and, at an opposing end, a location means and wherein biasing means are provided between the said support plate or foot portion and the location means and a shaft extends between said location means and the support plate or foot portion.

In one embodiment, the location means is a flange provided with engagement means to allow the same to be attached to a support member in use.

In one embodiment, the shaft passes through the biasing means or at least one biasing member and through a housing which is located between the said location means and the biasing means or at least one biasing member.

In one embodiment, the biasing assembly is provided to be retrofitted and be replaceable from the support member of the support device.

DESCRIPTION OF THE DRAWINGS

According to further independent aspects of the present invention there is provided a method of using a support device and/or a method of using a biasing assembly.

Specific embodiments of the invention are now described with reference to Figures as follows:

FIG. 1 illustrates in a schematic manner, a support device in accordance with one embodiment of the invention.

FIG. 2 illustrates in greater detail, the support biasing assembly in accordance with one embodiment of the invention.

FIG. 3 illustrates an alternative embodiment of a support biasing assembly in accordance with one embodiment of the invention.

DESCRIPTION OF THE INVENTION

Referring firstly to FIG. 1, there is illustrated a support device 2 in accordance with one embodiment of the invention and it will be appreciated that the middle section 4 of the device is not shown due to the fact that the length of the support device can be provided to be of any suitable length within a predetermined length range. At each end of the support device, there is provided an anchor plate or foot portion 6, 8 respectively. These are provided so as to engage with surfaces between which the support device extends and could, for example, be a floor and a ceiling of a structure so that the support device extends between the floor and the ceiling with the anchor plates 6, 8 in location therewith. The support device typically is provided with attachment means (not shown) to allow one or more panels or barriers to be attached thereto in use. Typically the panels or bathers are arranged so as to extend between adjacent spaced support devices in use.

The support device includes a first support member 12 which is an inner member and a second support member 10 which is an outer member. The inner member 12 is provided to be slidably moveable as indicated by arrow 14 within a hollow interior of the outer member 10 so as to act in a telescopic manner and therefore allow the length of the support device to be selected to suit the particular location at which the same is to be fitted. For example, the first and second members 12, 10 can be moved between extended and retracted positions to allow detachable engagement of the support device, and particularly engagement of the distal ends of the support device, between two surfaces in use.

In accordance with the invention, one of the members, and in this case the inner member 12, is provided with a biasing assembly 16 located at an end 18 thereof. The biasing assembly biases the anchor plate 6 outwardly of the inner support member 12 to ensure the support device is placed in sufficient compression to ensure engagement between the two surfaces in use. The end 18 to which the biasing assembly 16 is located is typically the end which is the free end of the inner member 12 (i.e., the end which is not located within the outer member 10). At the end 18 of the inner member 12, there is provided a flange or other form of locating means 19 and with which a flange or other form of locating means 22 of the biasing assembly 16 is directly or indirectly located. In the illustrated example, a spacer member 20 is provided between a flange of the biasing assembly 16 and the flange 19 of the inner member 12. However, the flange 22 of the biasing assembly 16 could be engaged directly with flange 19 of the inner member 12 if required.

This arrangement is shown in greater detail in FIG. 2 and it will therefore be seen that the biasing assembly 16 extends from the anchor plate 6 at one end to flange 22 at the opposing end. The flange 19 is typically attached to the end of the inner member 12, and in one embodiment, this can be achieved via a weld connection 24. The flanges 19, 22 and spacer member 20 are provided with corresponding channels 26 for the receipt of bolts or other engagement means 28 to allow the flanges to be joined together and hence the biasing assembly 16 to be located on the end of the inner member 12.

The biasing assembly 16 includes an inner shaft 30 which extends from a head portion 32 adjacent to the anchor plate 6, along the longitudinal axis 34 of the assembly to be engaged with the flange 22. Thus, the shaft acts to provide rigidity and support to the assembly 16 and to secure resilient biasing members of the biasing assembly 16 in position along the longitudinal axis 34.

The head portion 32 of the inner shaft 30 is larger than an aperture defined in anchor plate 6 through which the inner shaft 30 is located, thereby preventing the head portion 32 from passing through the aperture in use and preventing removal of the inner shaft 30 from the anchor plate 6 in use.

An opposite end 33 of inner shaft 30 is engaged in a recess within flange 22 to maintain the position of the inner shaft in use.

Resilient biasing means or first biasing members in the form of compression members (shown by dotted lines 35) are provided around the inner shaft 30 and between flange 22 and a washer or plate 38 of the biasing assembly 16. Thus, the first biasing members are provided externally of and separate to the inner support member 12.

The biasing assembly 16 includes a housing 36 which passes around the inner shaft 30 and first biasing members 35 to protect the same in use. Although the housing 36 is located on the biasing assembly 16, it is typically a loose fitting or detachably attachable so as to allow easy removal of the same from the biasing assembly in use. This allows for easy maintenance and repair of the biasing members 35 in use.

The biasing assembly 16 can include a second biasing member in the form of a compression spring 40. The second biasing member is provided between the washer 38 and the anchor plate 6. Biasing member 40 acts to provide a biasing force to allow activation of a compression indication member 41 in use.

Both the first and second biasing members 35, 40 provide a biasing force in the direction 42 away from the flange 22 of the biasing assembly 16 and the support member 12.

It will be appreciated that the first and/or second biasing members could be of any suitable form but, in the example shown in FIG. 2, is a series of Belleville washers or a spring. The biasing members are resilient such that if a force is applied in the direction 44 on the anchor plate 6 in use, then, while the anchor plate 6 can move in the direction of 44 towards the support member 12 within a given range, when the force is released, the biasing members 35, 40 will cause the anchor plate 6 to move in a direction away from the support member 12 to a rest position. This thereby allows the support device to be moved into position between two surfaces in use, and retained in said position when the locking means between the first and second members of the support device are in a locked position.

The compression indication member 41 in this example is pivotably mounted to the external surface of housing 36 via pivot pin 45 and movable between at least two different positions. When the support device is placed under sufficient compression to allow secure engagement between two surfaces, member 41 is in a horizontal position or a position that is perpendicular to the longitudinal axis of the support device. When the support device is not placed under sufficient compression or when no compression is being applied, member 41 is at an acute angle to the horizontal or to the longitudinal axis of the support device. This allows a user to quickly and easily visualise whether the support device has been placed under a correct amount of compression in use.

FIG. 3 illustrates an alternative embodiment of the present invention in which the biasing assembly 16 is again provided with an anchor plate 6, flange 22 and inner shaft 30 provided along a longitudinal axis 34. However, in this embodiment, the resilient biasing means are provided in the form of a compression bush arbour which, in one embodiment, comprises a series of compressible parts 46 located between holders 48. The compressible parts 46 can compress together in a resilient manner when force is applied in the direction of arrow 44 to the anchor plate 6. Thus, once again, there is provided a biasing assembly which can be mounted to an end of the inner member 12 of the support device and allows the required compression and movement of the anchor portion 6 to be achieved and to be achieved in a controlled manner whilst allowing the biasing assembly to be accessible for maintenance and to reduce the possibility of ingress of dirt and debris therein.

The invention claimed is:

1. A support device, said support device comprising:
at least first and second support members, each support member having a longitudinal axis, said at least first and second support members movable with respect to each other in a direction parallel to each longitudinal axes, distal ends and the distal ends each including an anchor portion to engage directly or indirectly with a surface in use, a biasing assembly for biasing one or more of the distal ends of the support device into engagement with the surface in use, wherein the biasing assembly is located at or adjacent an end of at least one of said first and second support members, and located between said at least one of said first and second support member end and the anchor portion nearest to said at least one of said first and second support member end, engagement means for engaging the biasing assembly to at least one support member end provided with a support member flange; and wherein the biasing assembly is provided with a biasing flange, radially outwardly protruding or outwardly protruding member which acts as an interface with the support member flange or outwardly protruding member of the at least one support member end and the engagement means joins the biasing and support member flanges together and joins the biasing assembly to the at least one support member in use.

2. The support device according to claim 1 wherein the biasing assembly is located at the end of the first or second support members, at least part of which acts as an inner member of the support device in use.

3. The support device according to claim 1 wherein the biasing assembly includes biasing means or at least one biasing member.

4. The support device according to claim 1 wherein the support device includes locking means for locking the at least first and second support members in a user selected position relative to each other in use.

5. The support device according to claim 1 wherein the at least first and second support members are slidably movable relative to each other.

6. The support device according to claim 1 wherein the engagement means engages the biasing assembly to the end of at least first and second support member in use.

7. The support device according to claim 6 wherein the end of the at least first and second support member is provided with the support member flange, and the biasing assembly is engaged with the support member flange via the engagement means.

8. The support device according to claim 7 wherein the biasing assembly is also provided with the biasing flange which acts as an interface with the support member flange of said at least first and second support member, and the engagement means is provided to join the support member flange and biasing flange together and hence join the biasing assembly to the at least first and second support member in use.

9. The support device according to claim 1 wherein the engagement means includes one or more members selected from the group consisting of: screws, nuts and bolts, inter-engaging members, clips, friction fit, and welding.

10. The support device according to claim 1 wherein the biasing assembly is separate to and external of the at least first and second support members.

11. The support device according to claim 1 wherein one of the first and second support members has a first end adjacent to the anchor portion and is at or adjacent one of the distal ends of the support device and a second end of the support member locates in or around another support member.

12. The support device according to claim 1 wherein the biasing assembly is located on, at or adjacent an end of the at least one first and second support member which acts as an inner member of the support device.

13. The support device according to claim 1 wherein at least one of the first and second support members is a hollow portion, and at least part of the other of the first and second support members is movably mounted within the hollow portion of the at least one of said first and second support member.

14. The support device according to claim 13 wherein the at least first and second support members are slidably movable relative to each other so as to be moved between an extended and a retracted position.

15. The support device according to claim 1 wherein a length of the support device is adjusted to allow engagement between two opposing surfaces and the support device is adjustable by a user to allow engagement between said two opposing surfaces.

16. The support device according to claim 1 wherein the support device is in the form of an elongate support post.

17. The support device according to claim 1 wherein the anchor portion allows at least one anchoring and/or engagement of said anchor portion with the surface and is provided in the form of a plate including one or more teeth or engaging portions for engaging with the surface.

18. The support device according to claim 1 wherein the support device includes locking means for locking the at least first and second support members in a selected position.

19. The support device according to claim 18 wherein the locking means includes user actuation means to allow movement of the locking means between locked and unlocked positions.

20. The support device according to claim 1 wherein one or more spacer members are provided between the support member flange of the support member and the biasing assembly, and the biasing assembly engages with the one or more spacer members and/or the support member flange of the support member.

21. The support device according to claim 1 wherein the biasing assembly includes an inner shaft which is used to provide support and rigidity to the biasing assembly and/or to secure the biasing assembly to the support member or to a spacer member at a first end and/or to the anchor portion at a second end.

22. The support device according to claim 1 wherein the biasing assembly includes a housing,, and the a biasing means is contained within the housing and the housing of the biasing assembly is located between the biasing flange of the biasing assembly and/or support member and the anchor portion.

23. The support device according to claim 22 wherein the biasing assembly includes first and second biasing means, said first biasing means separated from the second biasing means by a spacer member.

24. The support device according to claim 1 wherein compression indication means are provided on or associated with the support device, at least one of the biasing assembly and/or the housing of the biasing assembly for providing an indication to a user as to whether the support device has been placed under sufficient compression in use.

25. The support device according to claim 1 wherein said biasing assembly is a resilient biasing assembly and the support device is adjustable telescopically, said biasing assembly provided with a support plate or foot portion at one end and, at an opposing end, a location means and biasing means are provided between the said support plate or foot portion and the location means and a shaft extends between said location means and the support plate or foot portion.

26. The safety fence including one or more support devices as defined in claim 1.

27. The support device according to claim 1 wherein the biasing assembly includes first and second biasing means, the first biasing means separated from the second biasing means by a spacer member.

28. A support device, said support device comprising:
- at least first and second support members, each support member having a longitudinal axis, said at least first and second support members movable with respect to each other in a direction parallel to each longitudinal axes,
- distal ends and the distal ends each including an anchor portion to engage directly or indirectly with a surface in use,
- a biasing assembly for biasing one or more of the distal ends of the support device into engagement with the surface in use,
- wherein the biasing assembly is located at or adjacent an end of at least one of said first and second support members and between said at least one of said first and second support member end and the anchor portion nearest to said at least one of said first and second support member end
- engagement means for engaging the biasing assembly to at least one support member end provided with a support member flange; and
- wherein the biasing assembly is provided with a biasing flange, radially outwardly protruding or outwardly protruding member which acts as an interface with the support member flange or outwardly protruding member of the said support member and the engagement means joins the support member and biasing flanges together and joins the biasing assembly to the at least one of said first and second support member in use; and
- wherein one or more spacer members are provided between the support member flange of the at least one first and second support member and the biasing assembly and the biasing assembly engages with the one or more spacer members and/or the support member flange of the at least one first and second support member.

* * * * *